(12) United States Patent
Jiang et al.

(10) Patent No.: US 11,743,001 B2
(45) Date of Patent: Aug. 29, 2023

(54) INDEXING-BASED FEEDBACK CODES AND METHODS OF USE

(71) Applicant: Aira Technologies, Inc., Saratoga, CA (US)

(72) Inventors: Yihan Jiang, Cupertino, CA (US); Ravikiran Gopalan, Cupertino, CA (US); Amaael Antonini, Los Angeles, CA (US); Anand Chandrasekher, Saratoga, CA (US)

(73) Assignee: Aira Technologies, Inc., Saratoga, CA (US)

(*) Notice: Subject to any disclaimer, the term of this patent is extended or adjusted under 35 U.S.C. 154(b) by 0 days.

(21) Appl. No.: 17/556,155

(22) Filed: Dec. 20, 2021

(65) Prior Publication Data

US 2022/0209897 A1  Jun. 30, 2022

Related U.S. Application Data

(60) Provisional application No. 63/131,268, filed on Dec. 28, 2020.

(51) Int. Cl.
| | |
|---|---|
| *H04L 1/24* | (2006.01) |
| *H04L 1/00* | (2006.01) |
| *H04L 1/1867* | (2023.01) |
| *H04L 1/08* | (2006.01) |
| *H04L 1/20* | (2006.01) |

(52) U.S. Cl.
CPC ............ *H04L 1/242* (2013.01); *H04L 1/0009* (2013.01); *H04L 1/0041* (2013.01); *H04L 1/0046* (2013.01); *H04L 1/0047* (2013.01); *H04L 1/0061* (2013.01); *H04L 1/0072* (2013.01); *H04L 1/0091* (2013.01); *H04L 1/08* (2013.01); *H04L 1/1867* (2013.01)

(58) Field of Classification Search
None
See application file for complete search history.

(56) References Cited

U.S. PATENT DOCUMENTS

| | | | |
|---|---|---|---|
| 5,022,029 A | 6/1991 | Guichon | |
| 5,657,325 A * | 8/1997 | Lou | ...................... H04B 7/0623 370/334 |
| 5,910,182 A | 6/1999 | Dent | |
| 5,968,197 A | 10/1999 | Doiron | |

(Continued)

FOREIGN PATENT DOCUMENTS

| | | | | |
|---|---|---|---|---|
| CN | 106487610 A | * | 3/2017 | ............... H04L 1/20 |
| GB | 2493081 A | | 1/2013 | |

OTHER PUBLICATIONS

Interview Agenda (Year: 2022).*

(Continued)

*Primary Examiner* — April Y Blair
*Assistant Examiner* — Dipakkumar B Gandhi
(74) *Attorney, Agent, or Firm* — Carr & Ferrell LLP

(57) ABSTRACT

Indexing-based feedback codes and methods of use are disclosed herein. An example method includes determining error correction for a received packet having errors, generating an index of the error correction, the index including error positions for the errors in the received packet, and transmitting the index to a decoder receiver. The receiver using the index to correct the errors in the packet.

23 Claims, 11 Drawing Sheets

(56) References Cited

U.S. PATENT DOCUMENTS

| | | | |
|---|---|---|---|
| 6,126,310 A | 10/2000 | Osthoff et al. | |
| 6,145,109 A * | 11/2000 | Schuster | H03M 13/373 |
| | | | 714/752 |
| 6,418,549 B1 | 7/2002 | Ramchandran | |
| 6,487,690 B1 * | 11/2002 | Schuster | H04L 1/0057 |
| | | | 714/752 |
| 6,505,253 B1 | 1/2003 | Chiu | |
| 6,523,068 B1 | 2/2003 | Beser et al. | |
| 7,016,658 B2 | 3/2006 | Kim et al. | |
| 7,124,205 B2 | 10/2006 | Craft et al. | |
| 7,447,234 B2 | 11/2008 | Colas et al. | |
| 7,664,883 B2 | 2/2010 | Craft et al. | |
| 7,848,350 B1 | 12/2010 | Inamdar | |
| 7,971,131 B1 * | 6/2011 | Ordentilch | H03M 13/3746 |
| | | | 714/786 |
| 8,223,643 B1 * | 7/2012 | Wolfgang | H04L 1/0071 |
| | | | 370/252 |
| 8,305,963 B1 | 11/2012 | Breau | |
| 8,327,232 B2 | 12/2012 | Budampati et al. | |
| 8,352,830 B2 | 1/2013 | Landschaft | |
| 8,437,267 B2 | 5/2013 | Amir et al. | |
| 8,473,821 B2 | 6/2013 | Taghavi Nasrabadi et al. | |
| 8,693,406 B2 | 4/2014 | Ahmadi | |
| 8,990,663 B2 | 3/2015 | Liu et al. | |
| 10,270,564 B2 | 4/2019 | Djukic et al. | |
| 10,491,569 B1 | 11/2019 | Powell | |
| 10,749,594 B1 | 8/2020 | O'Shea et al. | |
| 11,088,784 B1 | 8/2021 | Gopalan et al. | |
| 11,191,049 B1 | 11/2021 | Chandrasekher et al. | |
| 11,368,250 B1 | 6/2022 | Chandrasekher et al. | |
| 11,368,251 B1 | 6/2022 | Chandrasekher et al. | |
| 11,575,469 B2 | 2/2023 | Chandrasekher et al. | |
| 11,588,590 B2 | 2/2023 | Chandrasekher et al. | |
| 11,595,162 B2 | 2/2023 | Chandrasekher et al. | |
| 2001/0030954 A1 | 10/2001 | Hameleers | |
| 2002/0026523 A1 | 2/2002 | Mallory et al. | |
| 2002/0053062 A1 * | 5/2002 | Szymanski | H03M 13/6575 |
| | | | 714/801 |
| 2002/0054608 A1 * | 5/2002 | Wan | H03M 13/2707 |
| | | | 370/522 |
| 2002/0122510 A1 | 9/2002 | Yakhnich et al. | |
| 2003/0012287 A1 * | 1/2003 | Katsavounidis | H04N 21/434 |
| | | | 375/E7.137 |
| 2003/0215029 A1 * | 11/2003 | Limberg | H04N 5/211 |
| | | | 375/321 |
| 2004/0049725 A1 | 3/2004 | Golitschek et al. | |
| 2004/0170120 A1 | 9/2004 | Reunamaki et al. | |
| 2004/0261001 A1 * | 12/2004 | Chang | H04N 21/4382 |
| | | | 348/E5.003 |
| 2005/0094561 A1 | 5/2005 | Raaf | |
| 2005/0208897 A1 * | 9/2005 | Lyons | H04B 17/309 |
| | | | 455/67.11 |
| 2006/0021040 A1 | 1/2006 | Boulanger | |
| 2006/0047862 A1 | 3/2006 | Shearer et al. | |
| 2006/0268996 A1 | 11/2006 | Sethi et al. | |
| 2007/0168197 A1 | 7/2007 | Vasilache | |
| 2008/0002688 A1 * | 1/2008 | Kim | H04L 1/1887 |
| | | | 370/389 |
| 2008/0002790 A1 | 1/2008 | Itoh | |
| 2008/0126824 A1 | 5/2008 | Lee et al. | |
| 2008/0225735 A1 | 9/2008 | Qiu | |
| 2008/0250299 A1 | 10/2008 | Maillet et al. | |
| 2009/0086711 A1 | 4/2009 | Capretta et al. | |
| 2009/0119566 A1 | 5/2009 | Hiromitsu | |
| 2009/0276686 A1 | 11/2009 | Liu et al. | |
| 2010/0037270 A1 | 2/2010 | Bennet | |
| 2010/0103830 A1 | 4/2010 | Salgado et al. | |
| 2010/0165868 A1 | 7/2010 | Gersemsky | |
| 2010/0192175 A1 * | 7/2010 | Bachet | H04N 7/163 |
| | | | 705/347 |
| 2010/0202416 A1 | 8/2010 | Wilhelmsson et al. | |
| 2010/0262885 A1 | 10/2010 | Cheng | |
| 2011/0131461 A1 | 6/2011 | Schulz | |
| 2011/0206019 A1 | 8/2011 | Zhai et al. | |
| 2011/0206065 A1 | 8/2011 | Kim et al. | |
| 2011/0216787 A1 | 9/2011 | Ai et al. | |
| 2011/0258519 A1 | 10/2011 | Laevens et al. | |
| 2011/0302473 A1 * | 12/2011 | Zhou | H03M 13/05 |
| | | | 714/755 |
| 2012/0300642 A1 | 11/2012 | Abel et al. | |
| 2013/0018889 A1 | 1/2013 | Jagmohan | |
| 2013/0132786 A1 | 5/2013 | Tanigawa et al. | |
| 2013/0223203 A1 | 8/2013 | Bai | |
| 2013/0250179 A1 | 9/2013 | Lida | |
| 2013/0339036 A1 | 12/2013 | Baeckstroem et al. | |
| 2014/0140342 A1 | 5/2014 | Narad | |
| 2014/0241309 A1 | 8/2014 | Hilton et al. | |
| 2015/0009902 A1 * | 1/2015 | Emmanuel | H04W 72/0473 |
| | | | 370/329 |
| 2016/0006842 A1 | 1/2016 | Tahir | |
| 2016/0062954 A1 * | 3/2016 | Ruff | G06F 8/41 |
| | | | 715/249 |
| 2016/0254881 A1 * | 9/2016 | Meylan | H04L 1/188 |
| | | | 370/216 |
| 2017/0006616 A1 | 1/2017 | Singh et al. | |
| 2017/0012799 A1 | 1/2017 | Jiang | |
| 2017/0269876 A1 | 9/2017 | Mukhopadhyay et al. | |
| 2018/0013808 A1 | 1/2018 | Petry et al. | |
| 2018/0048567 A1 | 2/2018 | Ignatchenko | |
| 2018/0101957 A1 | 4/2018 | Talathi | |
| 2018/0167171 A1 | 6/2018 | Wu | |
| 2018/0267850 A1 | 9/2018 | Froelich et al. | |
| 2018/0288198 A1 | 10/2018 | Pope et al. | |
| 2018/0314985 A1 | 11/2018 | O'Shea | |
| 2018/0359811 A1 | 12/2018 | Verzun et al. | |
| 2019/0028237 A1 | 1/2019 | Pan et al. | |
| 2019/0037052 A1 | 1/2019 | Deshpande | |
| 2019/0097680 A1 | 3/2019 | O'Brien | |
| 2019/0097914 A1 | 3/2019 | Zhong et al. | |
| 2019/0392266 A1 | 12/2019 | Zhong et al. | |
| 2019/0393903 A1 | 12/2019 | Mandt et al. | |
| 2020/0128279 A1 | 4/2020 | Han et al. | |
| 2020/0177418 A1 | 6/2020 | Hoydis et al. | |
| 2020/0213152 A1 | 7/2020 | Choquette et al. | |
| 2020/0320371 A1 | 10/2020 | Baker | |
| 2020/0383169 A1 | 12/2020 | Takahashi et al. | |
| 2021/0014939 A1 | 1/2021 | Verzun et al. | |
| 2021/0034846 A1 | 2/2021 | Ko et al. | |
| 2021/0056058 A1 | 2/2021 | Lee et al. | |
| 2021/0120440 A1 | 4/2021 | Reimann et al. | |
| 2021/0319286 A1 | 10/2021 | Gunduz | |
| 2021/0392033 A1 | 12/2021 | Haartsen | |
| 2022/0045696 A1 * | 2/2022 | Boussard | H03M 13/09 |
| 2022/0114436 A1 | 4/2022 | Gopalan et al. | |
| 2022/0132367 A1 | 4/2022 | Liu et al. | |
| 2022/0209893 A1 | 6/2022 | Chandrasekher et al. | |
| 2022/0209894 A1 | 6/2022 | Chandrasekher et al. | |
| 2022/0209895 A1 | 6/2022 | Chandrasekher et al. | |
| 2022/0311542 A1 | 9/2022 | Chandrasekher et al. | |
| 2022/0321260 A1 | 10/2022 | Chandrasekher et al. | |

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801v1>, 24 pages.

Goplan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yamamoto-Itoh coding scheme to discrete memoryless broadcast channels." 2017 IEEE International Symposium on Information Theory (ISIT). IEEE, 2017, 5 pages.

Aoudia et al., "End-to-end learning of communications systems without a channel model." 2018 52nd Asilomar Conference on Signals, Systems, and Computers. IEEE, Dec. 5, 2018, 6 pages.

Duman et al., "On optimal power allocation for turbo codes."

(56) References Cited

OTHER PUBLICATIONS

Proceedings of IEEE International Symposium on Information Theory, IEEE, Jun. 29-Jul. 4, 1997, 1 page.
Arvinte et al., "Deep log-likelihood ratio quantization." 2019 27th European Signal Processing Conference (EUSIPCO). IEEE, 2019, 5 pages.
"International Search Report" and "Written Opinion", Patent Cooperation Treaty Application No. PCT/US2021/054265, dated Nov. 24, 2021, 24 pages.
"International Search Report" and "Written Opinion", Patent Cooperation Treaty Application No. PCT/US2021/0063356, dated Jan. 14, 2022, 9 pages.
"International Search Report" and "Written Opinion", Patent Cooperation Treaty Application No. PCT/US2021/06617, dated Mar. 11, 2022, 12 pages.
Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.
"International Search Report" and "Written Opinion", Patent Cooperation Treaty Application No. PCT/US2021/061902, dated Jan. 24, 2022, 11 pages.
Henze, Martin, "A Machine-Learning Packet-Classification Tool for Processing Corrupted Packets on End Hosts", Diploma Thesis, Chair of Communication and Distributed Systems, RWTH Aachen University, Mar. 2011, 103 pages.
Grcar, Joseph, "How ordinary elimination became Gaussian elimination", Historia Mathematica vol. 38 issue 2, May 2011; Available online Sep. 28, 2010; pp. 163-218.
"International Search Report" and "Written Opinion", Patent Cooperation Treaty Application No. PCT/US2021/064735, dated Mar. 17, 2022, 11 pages.

\* cited by examiner

INDEXING-BASED FEEDBACK CODES AND METHODS OF USE

CROSS REFERENCE TO RELATED APPLICATIONS

This application claims the benefit and priority of U.S. Provisional Application Ser. No. 63/131,268, filed on Dec. 28, 2020, which is hereby incorporated by reference herein, including all references and appendices cited therein, for all purposes as if fully set forth herein. This application is related to U.S. application Ser. No. 17/560,964, filed on Dec. 23, 2021, entitled "MULTI-BIT FEEDBACK PROTOCOL SYSTEMS AND METHODS," which is hereby incorporated by reference herein, including all references and appendices cited therein, for all purposes as if fully set forth herein.

DETAILED DESCRIPTION OF EXAMPLE EMBODIMENTS

The methods and systems disclosed herein pertain to telecommunications, and more specifically, but not by way of limitation, to transmission of messages and the correction of errors in those messages in a variety of ways. Some of these methods can include the use of one or more types of indexing associated with feedback to correct errors in messages exchanged between two end points.

SUMMARY

According to some embodiments, the present disclosure is directed to a method comprising determining error correction for a received packet having errors, generating an index of the error correction, the index comprising error positions for the errors in the received packet, and transmitting the index to a receiver decoder.

According to some embodiments, the present disclosure is directed to a method comprising transmitting a packet to a receiver over a channel having noise that causes the packet to be received with errors, providing a first round of error correction in response to the errors by source encoding and channel encoding an error vector of the errors as an index, and transmitting the index to the receiver.

According to some embodiments, the present disclosure is directed to a system comprising a transmitter encoder comprising a processor, the processor executing instructions to determine error correction for a received packet having errors, and generate an index of the error correction, the index comprising error positions for the errors in the received packet, and a receiver decoder comprising a processor, the processor executing instructions to deindex the index to identify the error positions, and correct the errors in the received packet using the error positions to generate a corrected packet.

According to some embodiments, the present disclosure is directed to a method comprising transmitting an original packet on an asymmetric link, the asymmetric link being a communication channel where available transmission power is not equal for both the transmitter and the receiver; receiving a received packet by a transmitter encoder; conducting a first round of error correction that comprises: generating an index of the error correction, the index comprising error positions for the errors; and transmitting the index on the forward link; conducting one or more additional rounds of error correction, each of the one or more additional rounds of error correction comprising: determining an error correction for errors in a corrected packet; generating an index of the error correction, the index comprising error positions for the errors; transmitting the index on the forward link; deindexing the index to identify the error positions; and correcting the errors in the received packet using the error positions to generate an additional corrected packet, wherein each round of the one or more additional rounds of error correction generates a new corrected packet.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Overview

Wireless communication requires sending information packets from the transmitter (Tx) to the receiver (Rx) without error. Even with strong error correction codes, the packet could be corrupted. Currently wireless protocol uses error detecting codes and retransmission schemes to protect the packet's integrity. An example method of error correction is referred to as cyclic redundancy check (CRC). CRC is the most-widely-used short error-detecting code to detect accidental payload changes. CRC is computed on the payload at the Tx, and attached to the end of the payload. Both payload and CRC are transmitted to Rx. At the receiver, the received CRC is compared to the CRC computed by the received payload.

If the received CRC equals the computed CRC, the CRC passes. If the received CRC doesn't match the computed CRC, the CRC fails. When CRC passes, it is of very high probability that the packet is not contaminated, so ACK is sent to the transmitter side, to signal the transmitter to continue to transmit the next packet. When CRC fails, it is of very high probability that the packet is contaminated, so NACK is triggered, to ask the transmitter for retransmission.

There is some probability that the ACK/NACK is not received by the Tx side. Then after a timeout, Tx will re-transmit the packet.

In some instances, even 1-bit of error causes full retransmission of the data packet. The feedback is one-bit information of whether the packet is received correctly or not, that is exactly one bit information (timeout is also a bit of information or packet not received correctly). Overall, with single-bit information feedback from Rx to Tx, the Tx cannot do anything other than re-transmitting the whole packet. When the received packet has only a one to a few bits of error, it is not efficient to retransmit the whole packet again.

Example Embodiments

Figure 1:
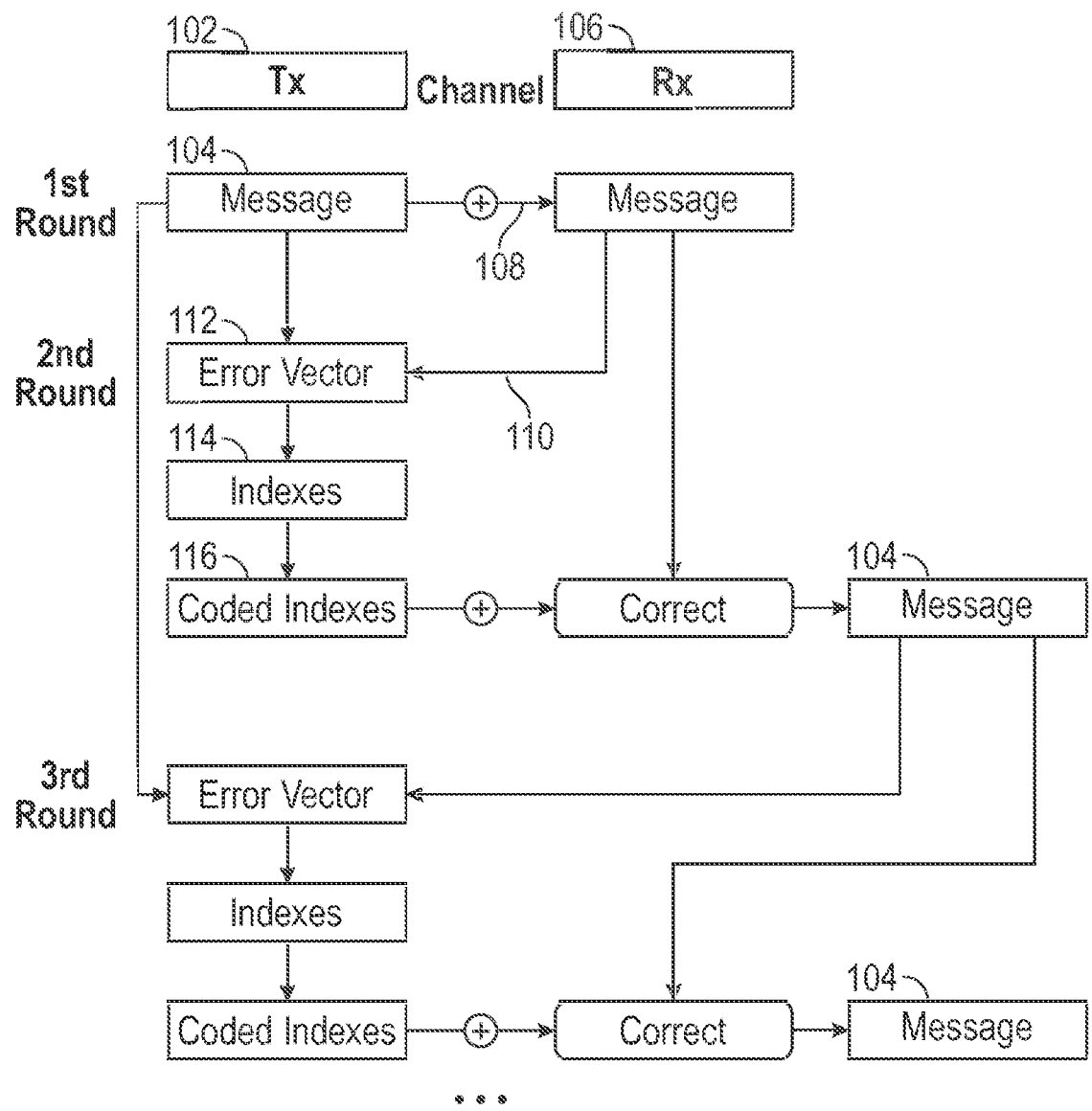
FIG. 1 is an example architecture where aspects of the present disclosure can be practiced, in combination with an example signal flow.
Figure 2:
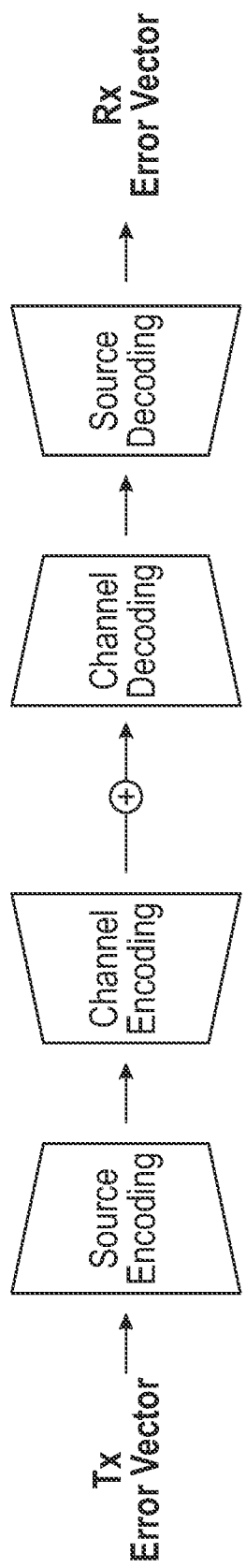
FIG. 2 is a signal flow diagram of an example indexing error correction method.

Referring now to FIGS. 1 and 2 collectively, which illustrate an example architecture and signal flow where aspects of the present disclosure are implemented. In more detail, FIG. 1 is a schematic signal flow of an example full feedback approach. In this example, the Tx 102 can transmit an original message 104 to the Rx 106 on a channel/forward link 108 that may be noisy and produce errors in the packet. Thus, in this example, only the channel/forward link 108 is noisy.

The Rx 106 detects errors using CRC or an equivalent method. The Rx 106 transmits feedback to the Tx 102 that comprises an Rx decoded packet. The Rx decoded packet is transmitted as feedback to Tx 102 on a noiseless link or channel 110. It will be understood that the noiseless reverse link is achieved in practice because (1) one device on the link, such as the Rx 106, transmits at higher power or (2) one device on the link, such as the Rx 106, uses a more robust modulation/coding scheme. To be sure, the forward link is the channel used by the Tx 102 to transmit the original message to the Rx 106.

When the Tx 102 receives decoded packet from the Rx 106, the Tx 102 determines a difference between the original message and what Rx 106 received and generates an error vector 112. In the next round, the Tx 102 transmits the error vector 112 to the Rx 106, rather than the original message. Rx 106 can perform packet correction with the received error vector 112 and the original/received message 104.

If the CRC computed by the Rx 106 on the corrected message passes, the Rx 106 will feedback an ACK to Tx 102, and the whole process converges. The Tx 102 transmits the next packet. If the CRC does not pass, the Rx 106 will feedback a NACK to Tx 102 along with the corrected message. Another error vector can be calculated by the Tx 102 and reused as described above. This iterative process can be performed in multiple rounds until a retransmission threshold is encountered. The retransmission threshold corresponds to a maximum number of rounds of error correction that can be attempted before failure is declared. When failure is declared by the Tx 102, the Tx 102 can start transmitting a next packet. The retransmission threshold is configurable and can be selected according to network design requirements.

Referring now to FIGS. 1 and 2 collectively, it will be understood that a feedback phase as described above can be divided into two portions, a source coding and a channel coding. The example indexing methods disclosed herein belong to the source coding portion. Source coding is a compression procedure for error vectors.

It will be understood that error vectors are typically sparse, and can be further compressed to a much shorter representation. The compressed representation can be heavily coded to avoid corruption via channel coding/encoding, and most of the time, even with heavy channel coding, the coded compressed representation is still much shorter than the original message, which could lead to improved efficiency and reliability.

An example process that can be used to compress error vectors involves error position indexing, which is diagrammatically illustrated in FIG. 2. The error position indexing/de-indexing approach can be used for compressing an error vector. The indexing method can be used to send an index of error positions. In the example of FIG. 2, an error position indexing source coding method may involve single bit indexing. An indexed code can be represented with three bits, to send an error vector of seven bits. Thus, the example of FIG. 2 illustrates the indexing method for a block of length N (N=7), where each error position requires ceiling (log(N)) bits. As N becomes larger, and the error vector is sparse, then the indexing method can save a significant amount of energy-per-bit. Referring back to FIG. 1, the Tx 102 can create an index 114 of the error correction and then create coded indexes 116, which are compressed representations of indexes.

Deindexing is the reverse operation of indexing, by reconstructing the error vector by the received indexed code at Rx side. The error vector can be noise tolerant and can be reconstructed correctly and without error assuming when the underlying channel code is applied.

Figure 3:
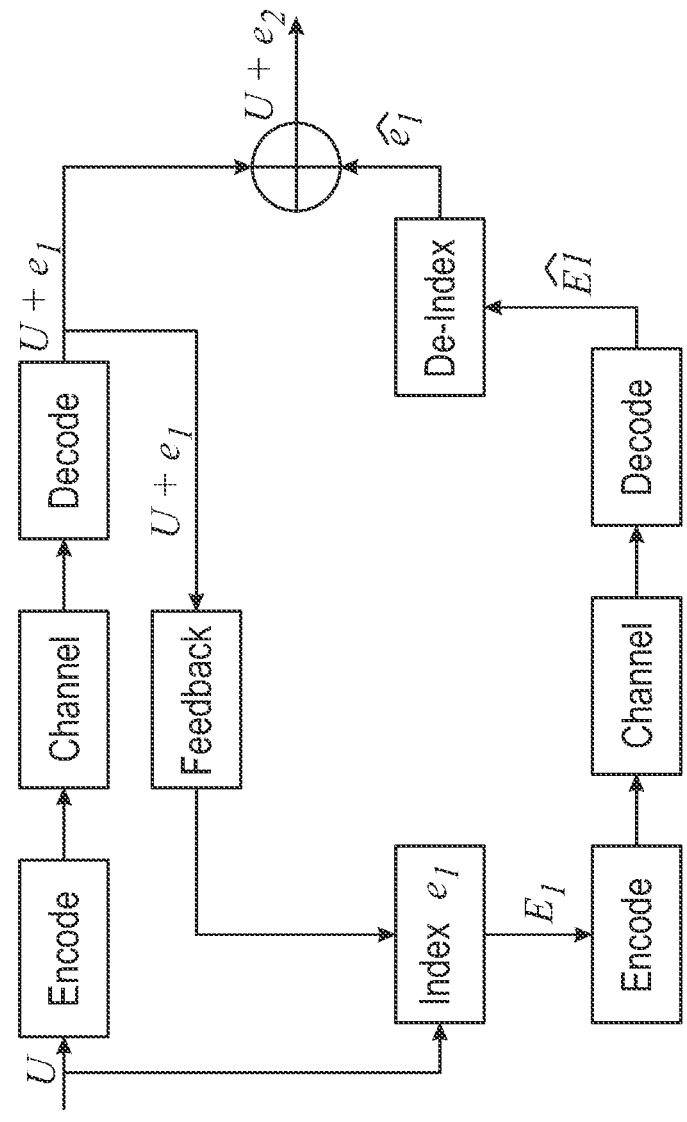
FIG. 3 is a schematic representation of a source and channel encoding/decoding process.
Figure 4:
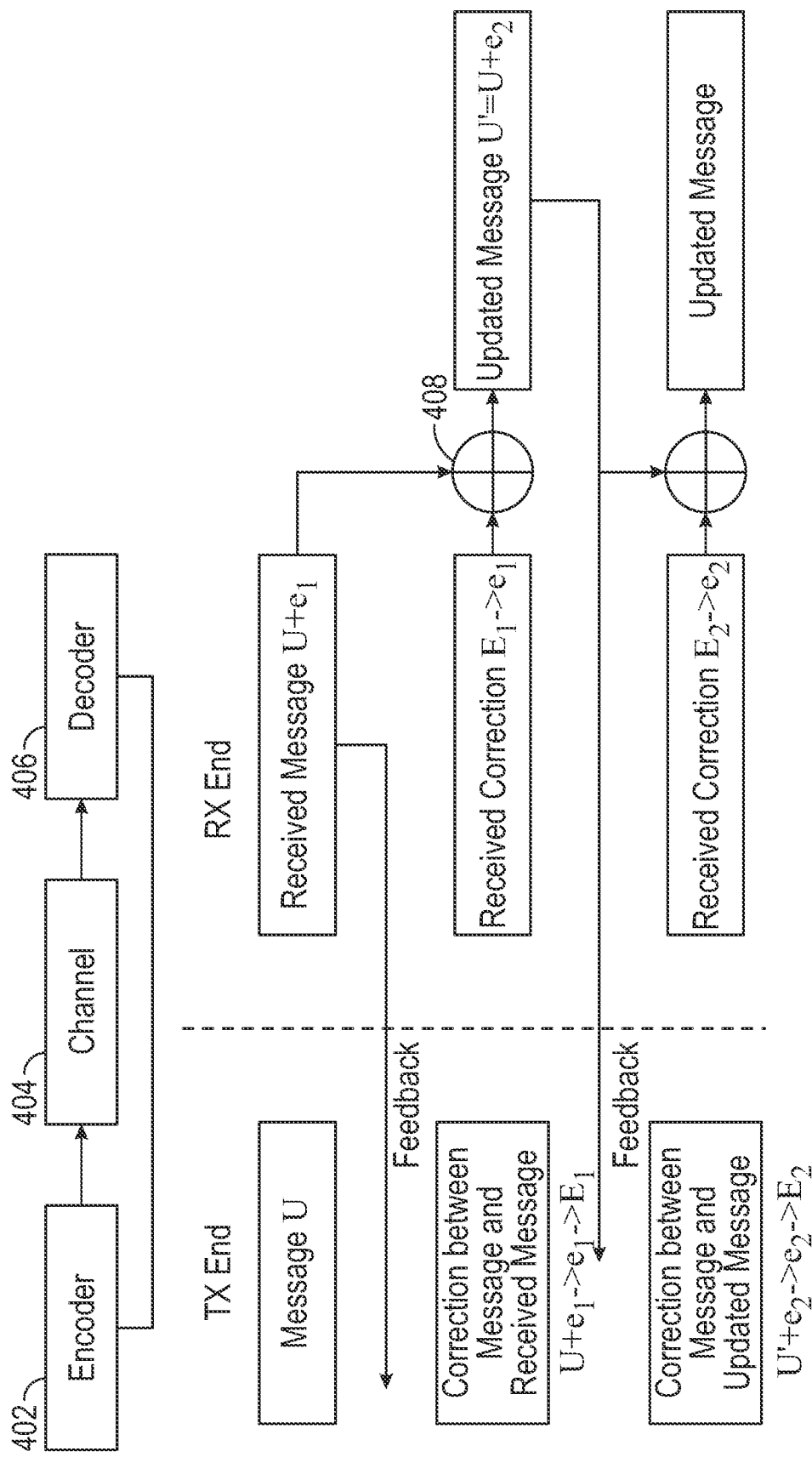
FIG. 4 is a schematic signal flow diagram of the present disclosure.

FIG. 3 is a schematic diagram of an example flow. FIG. 4 is a schematic signal flow diagram. The following descriptions will reference both FIGS. 3 and 4 collectively. An encoder 402 can transmit an original message U across a channel (e.g., any communications link) 404 to a decoder 406. In one example, the message U has a size of 100 bits. The message U is received in error resulting in an erroneous message $U+e_1$. That is, there are error bits $e_1$ present in the original message U. This erroneous message $U+e_1$ can be used as feedback. Using the entire erroneous message $U+e_1$ as feedback creates transmission overhead due to the size of the erroneous message $U+e_1$ which includes the original 100 bits of the message U with its error bits $e_1$.

In some embodiments, the encoder 402 can compare the original message U with the erroneous message $U+e_1$ to determine the error bits $e_1$. That is, the $U+e_1$ is compared with the original message U to identify the error bits $e_1$. These error bits $e_1$ can be indexed to create an index $E_1$. The index $E_1$ can be transmitted and de-indexed by the decoder 406. A recovered message U' can be recovered in an XOR process 408. CRC can be computed on the recovered message U', if the CRC passes the process terminates. If no errors are present, the process ends as the original message U has been correctly received. Otherwise, the process repeats using the feedback of $U+e_2$ and index $E_2$. This process can iterate until the original message is recovered with no errors or an indexing threshold is reached. For example, the process can be allowed to iterate five times (or any other number of rounds). If errors are still found after reaching the indexing threshold the message can be accepted as-is with errors. If there is no tolerance for errors (and the threshold has been reached) in the communications process the flow may terminate and the encoder or decoder may transmit a warning message or terminate communications.

Figure 5:
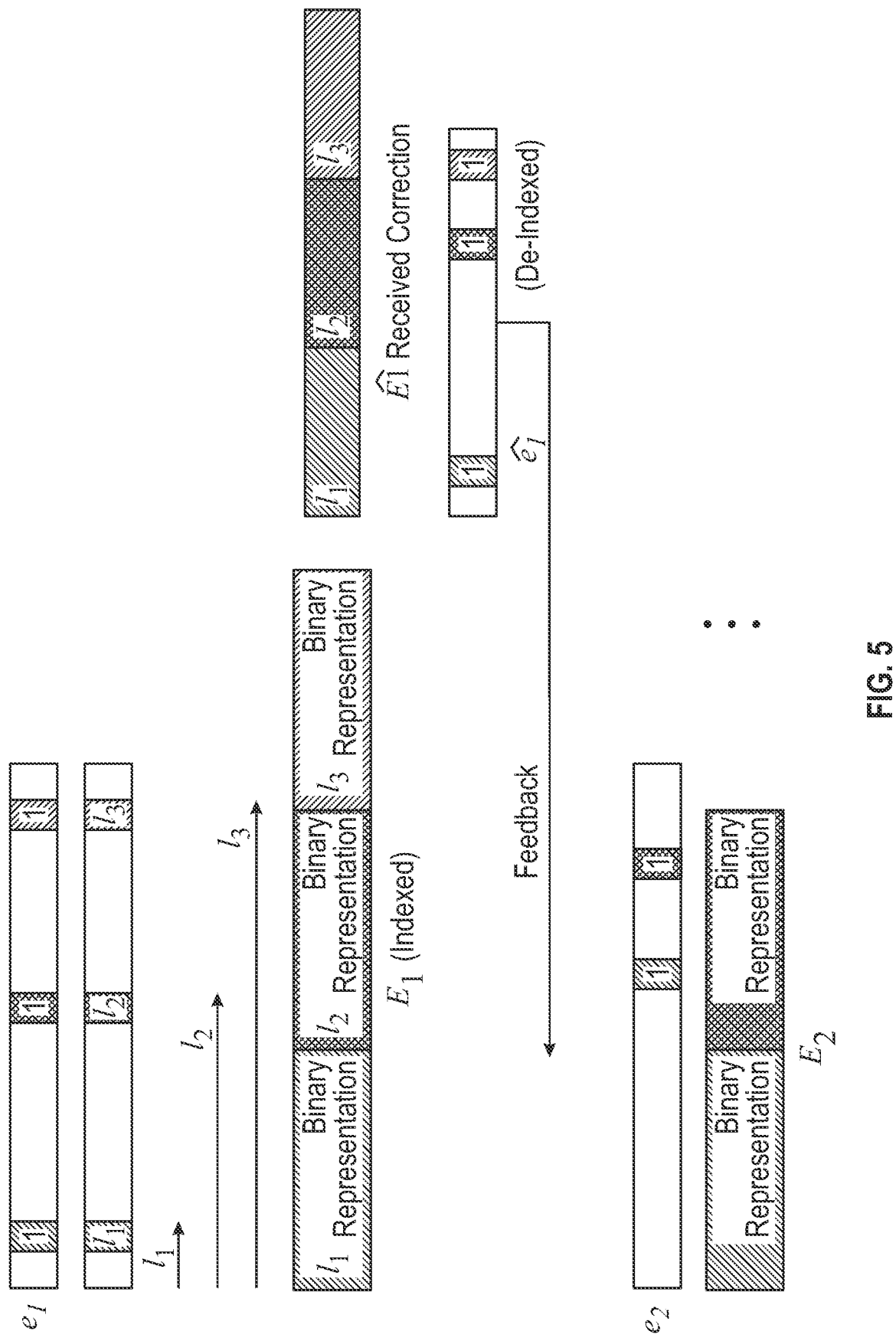
FIG. 5 is a flow of an example indexing process of the present disclosure.

An example indexing procedure is illustrated in FIG. 5, which is a schematic signal flow diagram. The error bits $e_1$ are illustrated as being a part of the original message U. That is, the error bits $e_1$ are illustrated as being dispersed throughout U, which is why this construct may be referred to as a sparse index. The locations of the errors are noted as l1, l2, and 13. By way of example, out of 100 bits of the message U, a first error at location l1 may be at position 5, a second error at location l2 may be at position 20, and a third error at location l3 may be at position 95. The selection of these locations and bits is arbitrary and provided for descriptive purposes only. Each error location requires 7 bits to uniquely identify (log 2(100)). So a total bitspace size of the error bits $e_1$ is 21 bits. Thus, instead of transmitting a 100 bit error message as feedback, an index $E_1$ having a size of 21 bits is transmitted.

Referring now to FIGS. 4 and 5 collectively, errors may be introduced when transmitting or decoding the index $E_1$. For example, the error corrections associated with the location l1 and the location l3 may have been received correctly, but error correction associated with location l2 were received in error. For example, the error correction of location l2 was incorrectly identified as belonging to location 50 instead of location 20. Thus, if corrected, an updated message U' would have the proper corrections for locations l1 and l3, but when a comparison is performed for the updated message U' would include not only the original error associated with location l2, but now in a fourth location l4. That is, the updated message U' has errors at position 20 (because it was never corrected) and at position 50 (the new error).

The process illustrated in FIG. 3 proceeds where new error bits $e_2$ are discovered in the updated message U'. These new error bits $e_2$ are converted into an index $E_2$. This index can be de-indexed to recover the new error bits $e_2$ and correct the updated message U'. Again, if the errors in the updated message U' are gone, the process can terminate. Otherwise, another round of feedback and error correcting can occur. Collectively, the processes illustrated in FIGS. 3-5 are referred to generally as simple indexing.

Figure 7:
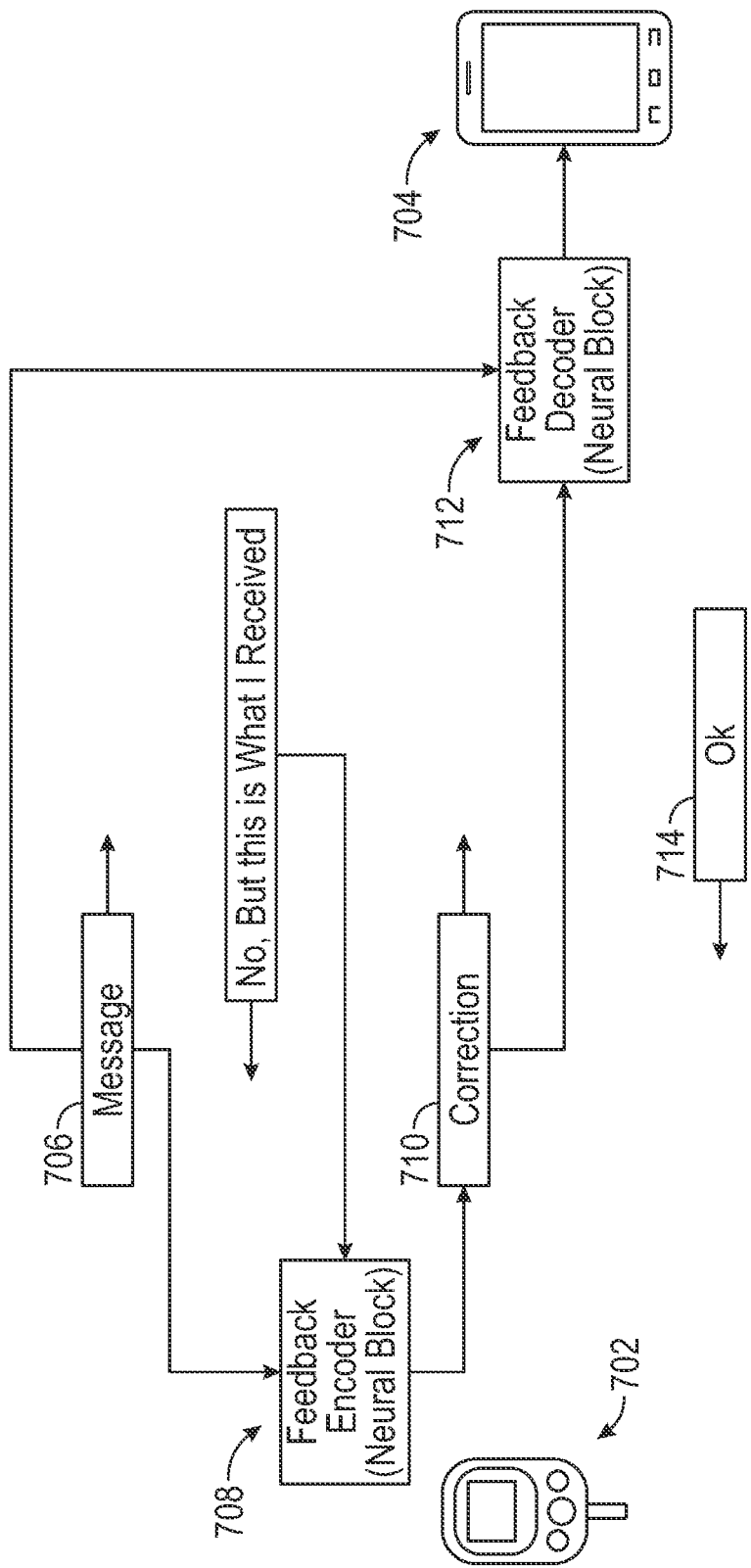
FIG. 7 is a schematic and flow diagram of an example architecture or environment.

Rather than using iterative processes that involve evaluating updated messages as feedback, another process referred to as telescopic indexing can be used. In general, telescopic indexing allows for errors in correction messages to be identified and remedied. Referring now to FIGS. 4 and 7 collectively, in an initial flow, the encoder 402 transmits an original message U to a decoder 406. Errors may be introduced into the original message U that results in an erroneous message being received erroneous message $U+e_1$. The encoder 402 can compare the erroneous message $U+e_1$ to the original message U to determine the error bits $e_1$. These error bits $e_1$ can be indexed as E1 and transmitted to the decoder 406. Assuming no additional errors have been introduced into the index $E_1$ the error bits $e_1$ can be used to correctly decode the original message U.

An erroneous index $\widehat{E1}$ is created when an error is introduced into the index E1 (could be introduced during transmission, receipt, or deindexing). The decoder 146 can deindex the index E $\widehat{E1}$ but instead of recovering error bits $e_1$ the decoder 406 recovers error bits $\widehat{e_1}$, illustrated as a correction. Instead of feeding back the updated message U', the received correction $\widehat{e_1}$, is used for feedback. The encoder 402 can compare the transmitted index bits $\widehat{e_1}$ with the received index bits e1 to identify discrepancies. ˆ. If discrepancies are identified, the encoder 402 can correct these errors in the error bits $\widehat{e_1}$. Once all errors have been fixed, the various iterations of corrections such as the correction with error bits $e_1$ and the correction with error bits $\widehat{e_1}$ are processing using an XOR function (see FIG. 4) to recover the original message U.

In sum, after the initial process of comparing a received message to the original message U to identify errors, any further error correction will occur by comparing versions of corrections to identify errors. Once the correction has been perfected the original message U can be recovered.

Figure 6:
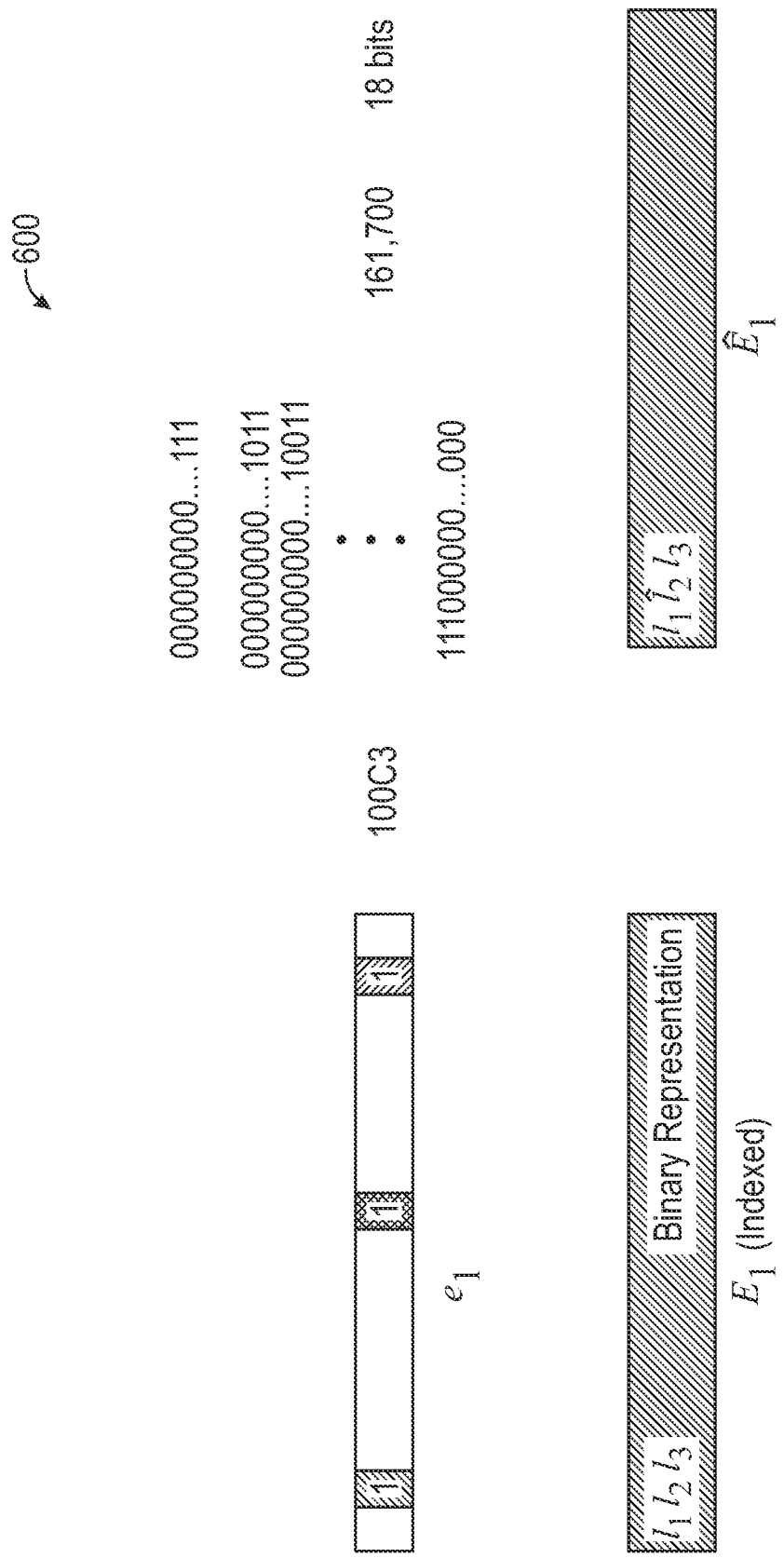
FIG. 6 schematically illustrates an example combinatorial optimization method for use in conjunction with a telescopic indexing method.

As noted above, one advantage of transmitting an index rather than an entire errant message as feedback is that this reduces transmission bandwidth requirement from 100 bits (as an example) to the index space, which is only a subset of the 100 bits. In the example given above the index had a bit size of 21 bits. In some instances, the index can be further reduced in size by optimizing the index through combinatorial optimization. For example, locations l1, l2, and l3 have individual bit sizes of 7 bits for a total of 21 bits. This same bitspace can be represented as 18 bits using combinatorial optimization as depicted in FIG. 6. The indexed binary representation E1 can be searched across a combinatorial space 600 to create a combinatorial optimized index $\widetilde{E1}$.

FIG. 7 is a schematic diagram of an example environment where aspects of the present disclosure can be practiced. The environment illustrates implementation of a multi-bit feedback system which provides improved communication efficiency. A multi-bit feedback system can feed back more than one-bit information and enables the Tx side to transmit information more efficiently (beyond just retransmission).

In this example, a first endpoint device such as an Internet-of-Things (IoT) sensor 702 (example Tx) can communicate with a second endpoint device, such as a Smartphone 704 (example Rx). Example use cases involving these devices are for descriptive purposes and are not intended to be limiting. In this embodiment, the sensor 702 is the transmitter (encoder) and the Smartphone 704 is a receiver (decoder). These roles can be reversed as necessary. In this example, a message 706 is transmitted from sensor 702 to Smartphone 704. Smartphone 704 returns feedback, which is processed by a feedback encoder 708 to produce a correction 710 that is transmitted to the Smartphone 704. The Smartphone 704 uses a feedback decoder 712 to process the original message and the correction. An ACK 714 message is transmitted from the Smartphone 704 to the sensor 702 when the message is corrected and matches the original message.

For context, IoT devices may include sensors, whose major functionality is to transmit sensor data to a host. IoT devices are typically power constrained, and the host is not power constrained and can use higher transmission power. Thus, a forward channel may be noisier than a feedback channel. This discrepancy is termed an asymmetric channel condition. When asymmetric channel conditions exist, it can be assumed that the Rx can send back information to Tx without error, while the Tx's information sent to Tx may be noisy. In some instances, an asymmetric link is a communication channel where available transmission power is not equal for both the transmitter and the receiver. For example, an asymmetry may exist when one device is a sensor and another device is a Smartphone. The smartphone will likely always have more power than a sensor. In another example, one device can include a base station, such as a cellphone transmitter. A second device using the link would be a Smartphone. In this example, a base station will likely always have more power. Additionally, an asymmetry may exist where one device has a more robust modulating/encoding scheme.

Figure 8:
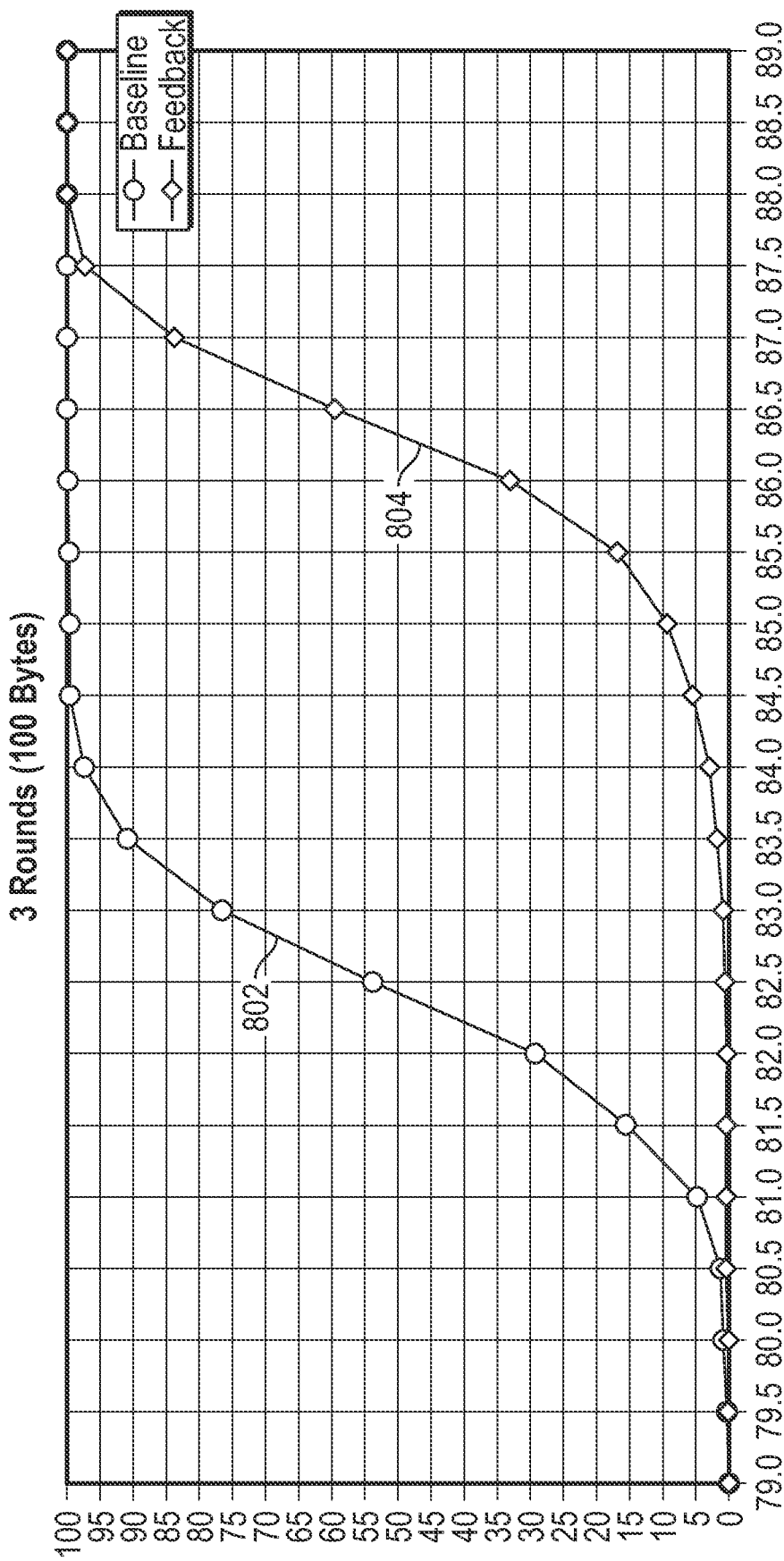
FIGS. 8 and 9 are both graphs of data packet transmission efficiency improvement using indexing as described herein.
Figure 9:
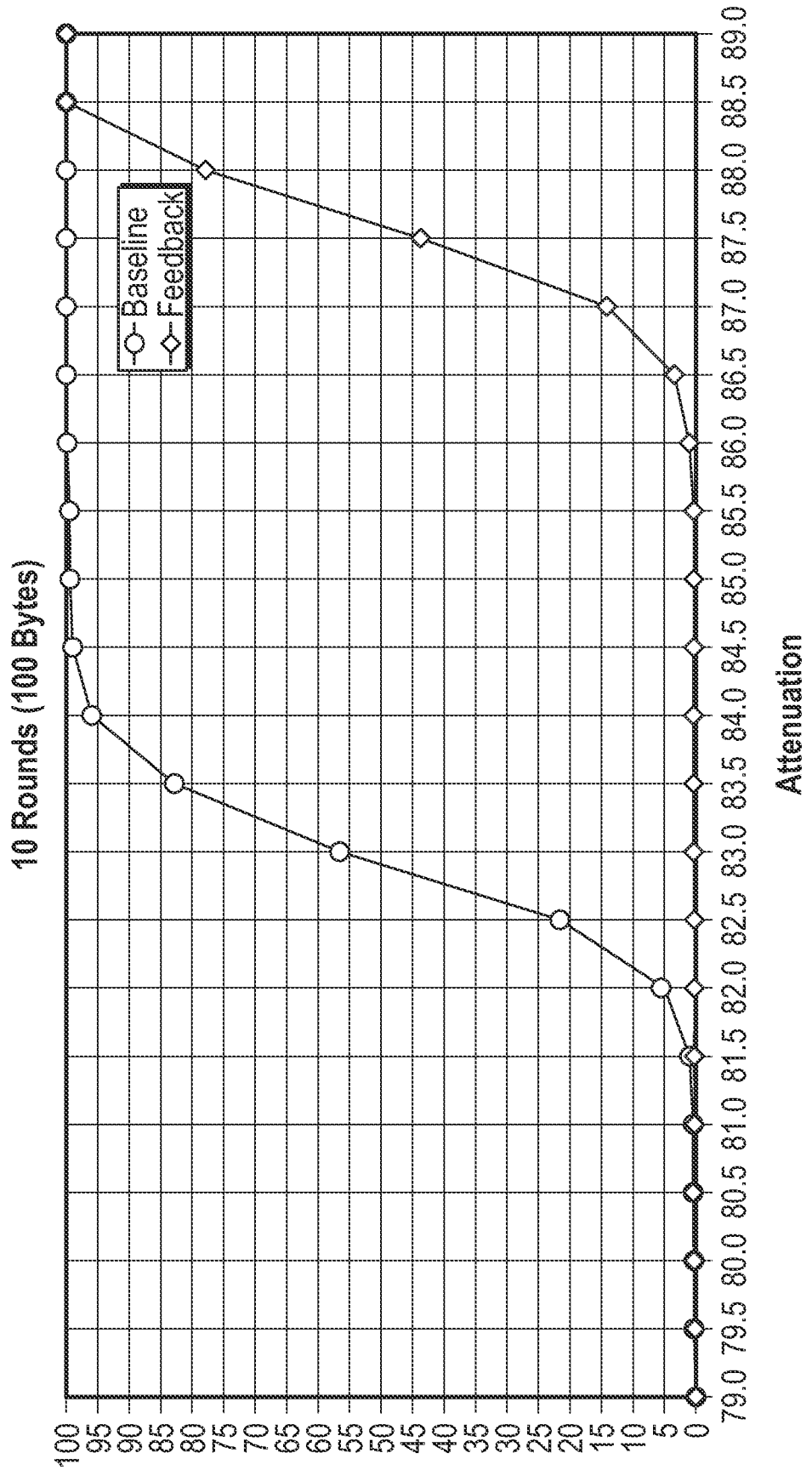

FIG. 8 is a graphical representation packet error rate versus attenuation. A shift in attenuation curve from a baseline (no error correction) 802, relative to indexing-based feedback 804 is shown. In this example, three rounds of error correction are used. As can be seen, when indexing-based feedback is used, packets can be successfully transmitted even when higher attenuation levels are experienced in the channel/link. FIG. 9 is a graphical representation of the shift in attenuation curve when ten rounds of error correction are used. To be sure, as more rounds of error correction are used, a corresponding increase in attenuation mitigation or response is achieved.

Figure 10:
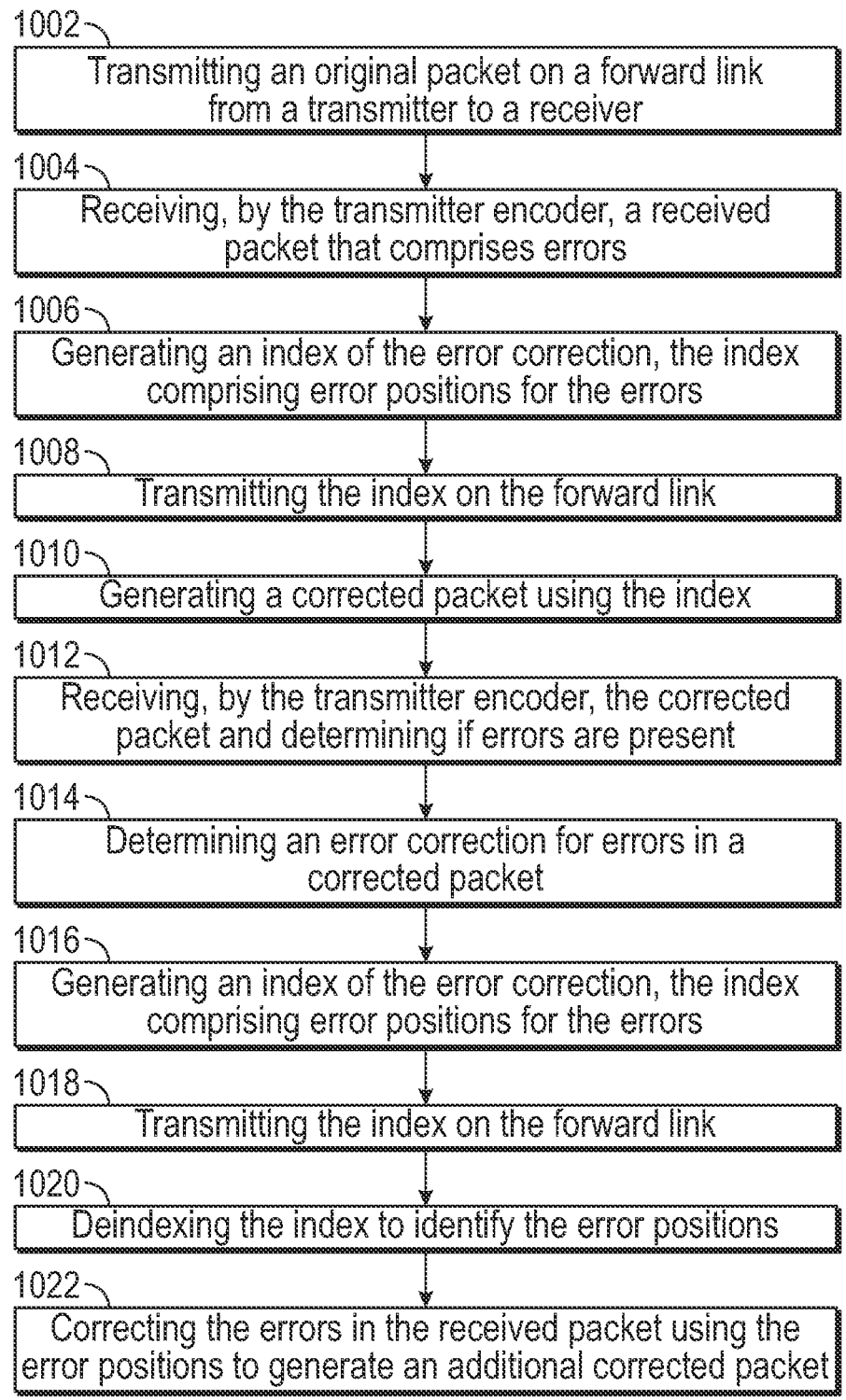
FIG. 10 is a flowchart of an example method of the present disclosure.

FIG. 10 is a flowchart of an example method. The method can involve the use of an asymmetric link that produces noise in packets transmitted on a forward link between a transmitter to a receiver, and no noise on a reverse link from the receiver to the transmitter.

The method can include a step 1002 of transmitting an original packet on a forward link from a transmitter to a receiver. As noted above, noise in the forward link may create errors in the original packet when it is received by the receiver decoder.

The method can include a step 1004 of receiving, by the transmitter encoder, a received packet that comprises errors. The method includes an iterative or cyclic error correction process that can involve one or more rounds of error correction. A first round of error correction can comprise a step 1006 of generating an index of the error correction, the index comprising error positions for the errors. The method also includes a step 1008 of transmitting the index on the forward link. The method can include a step 1010 of generating a corrected packet using the index. This can include deindexing the index and correcting the error bits. Again, the index indicates the location of bits that require flipping. The receiver decoder can flip bits in the received packet according to the error positions in the index to generate the corrected packet.

The method can include a step 1012 of receiving, by the transmitter encoder, the corrected packet and determining if errors are present. If no errors are present, the method terminates. If errors are present, the method can include a process of conducting one or more additional rounds of error correction. Each round can include a step 1014 of determining an error correction for errors in a corrected packet, as well as a step 1016 of generating an index of the error correction, the index comprising error positions for the errors. In some embodiments, the method includes a step 1018 of transmitting the index on the forward link and a step 1020 of deindexing the index to identify the error positions. In some embodiments, the method can include a step 1022 of correcting the errors in the received packet using the error positions to generate an additional corrected packet. It will be understood that each round of the one or more additional rounds of error correction generates a new corrected packet that can be compared to the original packet to determine if errors are or are not present.

Figure 11:
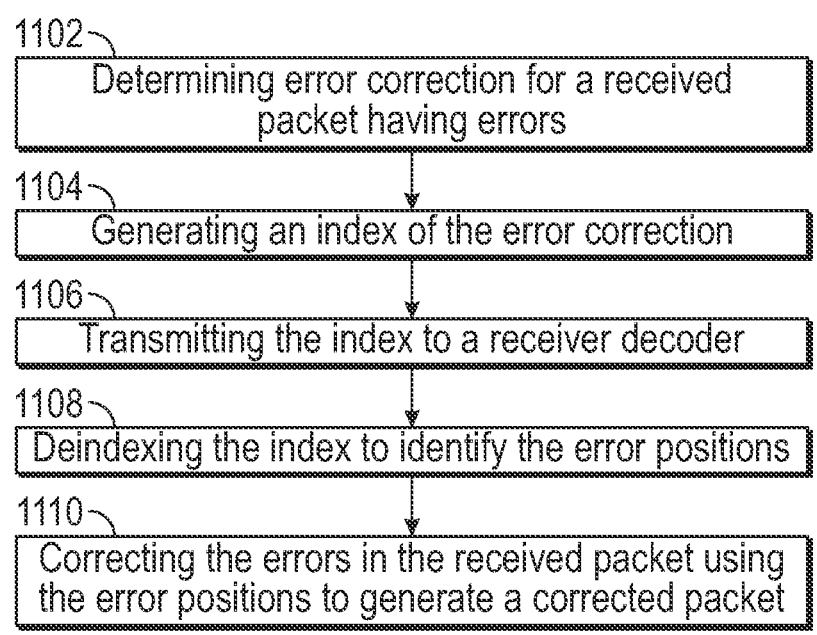
FIG. 11 is a flowchart of another example method of the present disclosure.

FIG. 11 is a flowchart of another example method. The method can include a step 1102 of determining error correction for a received packet having errors. This can include identifying bits that are erroneous. Next, the method can include a step 1104 of generating an index of the error correction. As noted above, the index comprises error positions for the errors in the received packet. The index can be a sparse index that can be optimized through compression. Next, the method includes a step 1106 of transmitting the index to a receiver decoder.

In various embodiments, the method can include as step 1108 of deindexing the index to identify the error positions, along with a step 1110 of correcting the errors in the received packet using the error positions to generate a corrected packet. The method can also include steps such as performing one or more additional rounds of error correction by comparing the corrected packet to an original packet, and generating another error correction and another index when errors are identified in the comparison.

In various instances, the one or more additional rounds of error correction terminate when a retransmission threshold is reached. The method can include transmitting a new packet when the retransmission threshold is reached or when a corrected packet corresponds to the original packet.

Figure 12:
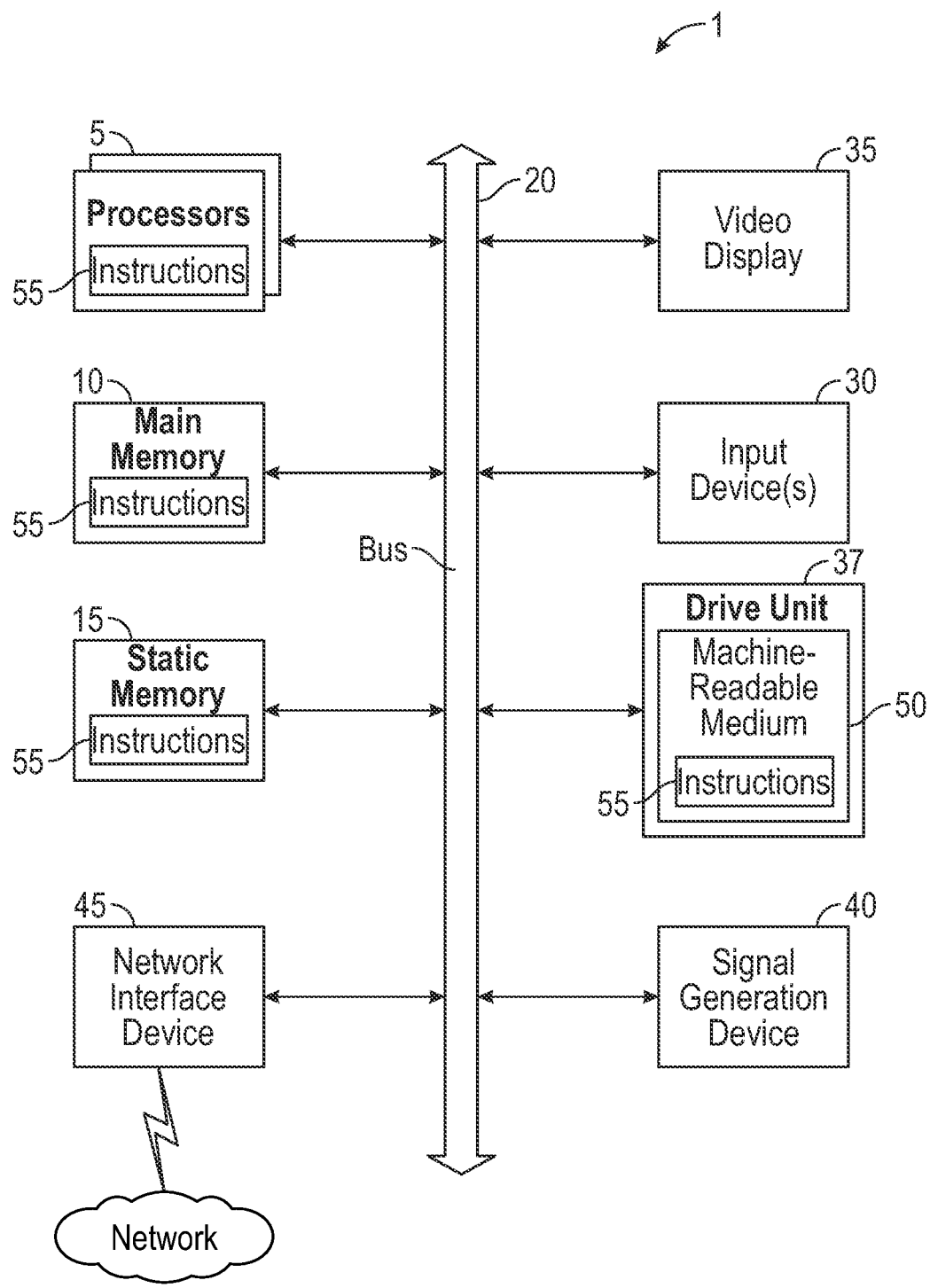
FIG. 12 is a schematic diagram of an example computer system that can be used to implement aspects of the present disclosure.

FIG. 12 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be an Internet-of-Things (IoT) device or system, personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The invention claimed is:

1. A method comprising:
    determining, at an encoder, error correction using a feedback packet for a received packet having errors, the received packet having been decoded at a decoder from an original packet which has been transmitted from the encoder to the decoder over a first communications channel, the feedback packet comprising the received decoded packet, which has been transmitted as the feedback packet from the decoder to the encoder over a second communications channel;
    generating, at the encoder, an index of the error correction using the feedback packet, the index comprising error positions for the errors in the feedback packet; and
    transmitting the index from the encoder to the decoder over the first communications channel as feedback to the decoder, the index transmitted instead of retransmitting the original packet to reduce transmission bandwidth requirement.

2. The method according to claim 1, further comprising: deindexing the index to identify the error positions; and correcting the errors in the received packet using the error positions to generate a corrected packet.

3. The method according to claim 2, further comprising performing one or more additional rounds of error correction by:

comparing the corrected packet to the original packet; and
generating another error correction and another index when errors are identified in the comparison.

4. The method according to claim 3, wherein the one or more additional rounds of error correction terminate when a retransmission threshold is reached.

5. The method according to claim 4, further comprising transmitting a new packet when the retransmission threshold is reached.

6. A method comprising:
transmitting an original packet from a transmitter to a receiver over a communications channel having noise that causes the original packet to be received with errors;
providing a first round of error correction in response to the errors in the received packet, the error correction comprising:
receiving at the transmitter a feedback packet from the receiver, the feedback packet comprising the received packet with the errors as received at the receiver;
determining error correction for the received packet with the errors using a comparison of the original packet and the feedback packet;
generating an index of the error correction, the index comprising error positions for the errors in the feedback packet, reflecting the errors in the received packet; and
transmitting the index, instead of retransmitting the original packet, from the transmitter to the receiver over the communications channel as feedback to the receiver, to reduce transmission bandwidth requirement.

7. The method according to claim 6, further comprising reconstructing an error vector using source encoding and channel encoding.

8. The method according to claim 7, wherein reconstructing the error vector comprises:
deindexing the index to identify error positions; and
correcting the errors in the received packet using the error positions to generate a corrected packet.

9. The method according to claim 8, further comprising performing one or more additional rounds of error correction by:
comparing the corrected packet to the original packet; and
generating additional error vectors and additional indexes when errors are identified in the one or more additional rounds of error correction.

10. The method according to claim 9, wherein the one or more additional rounds of error correction terminate when a retransmission threshold is reached.

11. A method comprising:
transmitting an original packet from an encoder to a decoder on an asymmetric link, the asymmetric link being a communication channel where available transmission power is not equal for both the encoder and the decoder, the asymmetric link including a forward link from the encoder to the decoder and a reverse link from the decoder to the encoder, a received packet at the decoder including errors introduced in the original packet as received at the decoder;
receiving a feedback packet at the encoder comprising the received packet from the decoder;
conducting a first round of error correction that comprises:
generating a first index of the error correction, the first index comprising error positions for the errors in the feedback packet;
transmitting the first index, instead of the original packet, from the encoder to the decoder via the forward link, the first index transmitted instead of the original packet to reduce transmission bandwidth requirement of the forward link;
deindexing the first index at the decoder to identify the error positions in the feedback packet; and
updating the received packet at the decoder using the first index; and
conducting one or more additional rounds of error correction using telescopic indexing, each of the one or more additional rounds of telescopic indexing comprising:
transmitting a feedback index via the reverse link from the decoder to the encoder, the feedback index transmitted instead of the updated packet, the feedback index resulting from errors introduced in the first index as received at the decoder;
determining an error correction for the errors in the feedback index from a comparison of the feedback index and the first index;
generating a second index of the error correction, the second index comprising error positions for the errors in the feedback index;
transmitting the second index from the encoder to the decoder via the forward link;
deindexing the second index at the decoder to identify the error positions in the first index; and
correcting the errors in the feedback index at the decoder using the error positions in the second index to generate an additional updated packet, wherein each round of the one or more additional rounds of error correction generates a new updated packet.

12. The method according to claim 11, wherein the one or more additional rounds of error correction are conducted until a retransmission threshold is reached or the packet is received without error by a receiver decoder.

13. The method according to claim 11, further comprising compressing the first index and the second index into coded indexes.

14. A system comprising:
a transmitter encoder comprising a processor, the processor executing instructions to:
determine error correction for a received packet having errors using a feedback packet;
generate an index of the error correction using the feedback packet, the index comprising error positions for the errors in the received packet; and
transmit the index, instead of a packet, from the transmitter encoder to a receiver decoder over a forward communications channel, to reduce transmission bandwidth requirement; and
the receiver decoder comprising a processor, the processor executing instructions to:
receive the packet transmitted from the transmitter encoder via the forward communications channel to the receiver decoder;
determine that the received packet has the errors;
transmit the received packet having the errors from the receiver decoder via a reverse communications channel to the transmitter encoder as a feedback packet;
receive the index transmitted from the transmitter encoder via the forward communications channel;
deindex the index to identify the error positions; and correct the errors in the received packet using the error positions to generate a corrected packet.

15. The system according to claim 14, wherein the transmitter encoder is configured to transmit the packet on a forward link of an asymmetric channel, the forward link having noise that creates the errors.

16. The system according to claim 15, wherein the transmitter encoder is configured to transmit the received packet on a reverse link of the asymmetric channel, the asymmetric channel being created due to a disparity in available transmitting power between the transmitter encoder and the receiver decoder.

17. The system according to claim 14, wherein the transmitter encoder is configured to:

determine the errors by comparing the received packet to an original packet; and determine an error vector from the errors.

18. The system according to claim 17, wherein the transmitter encoder is configured to generate the index from the error vector.

19. The system according to claim 18, wherein the receiver decoder is configured to reconstruct the error vector using a source encoding and a channel encoding.

20. The system according to claim 14, wherein the transmitter encoder and the receiver decoder are configured to perform one or more additional rounds of error correction that include the transmitter encoder being configured to:

compare the corrected packet to an original packet; and generate additional error vectors and additional indexes when errors are identified in the one or more additional rounds of error correction.

21. The system according to claim 20, wherein the transmitter encoder is configured to terminate the one or more additional rounds of error correction when a retransmission threshold is reached.

22. The system according to claim 14, wherein the transmitter encoder is configured to compress the index.

23. The system according to claim 14, wherein the transmitter encoder receives the corrected packet and compares the corrected packet to an original packet to determine if the corrected packet is correct or has additional errors.

* * * * *